(12) United States Patent
Ross

(10) Patent No.: US 8,365,294 B2
(45) Date of Patent: Jan. 29, 2013

(54) HARDWARE PLATFORM AUTHENTICATION AND MULTI-PLATFORM VALIDATION

(75) Inventor: Alan D. Ross, Shingle Springs, CA (US)

(73) Assignee: Intel Corporation, Santa Clara, CA (US)

( * ) Notice: Subject to any disclaimer, the term of this patent is extended or adjusted under 35 U.S.C. 154(b) by 1729 days.

(21) Appl. No.: 11/479,180

(22) Filed: Jun. 30, 2006

(65) Prior Publication Data

US 2008/0005798 A1 Jan. 3, 2008

(51) Int. Cl.
H04L 29/06 (2006.01)
G06F 9/455 (2006.01)
G06F 9/46 (2006.01)
G06F 21/00 (2006.01)
G06F 9/00 (2006.01)

(52) U.S. Cl. .................. 726/26; 726/1; 726/18; 726/19; 726/29; 709/227; 709/229; 370/229; 370/230; 718/1; 718/104

(58) Field of Classification Search ...................... 726/26
See application file for complete search history.

(56) References Cited

U.S. PATENT DOCUMENTS

| | | | | |
|---|---|---|---|---|
| 5,991,877 | A * | 11/1999 | Luckenbaugh | 726/1 |
| 6,105,131 | A * | 8/2000 | Carroll | 713/155 |
| 6,324,627 | B1 * | 11/2001 | Kricheff et al. | 711/163 |
| 7,146,499 | B2 * | 12/2006 | Yellepeddy | 713/165 |
| 7,225,341 | B2 * | 5/2007 | Yoshino et al. | 713/193 |
| 7,484,099 | B2 * | 1/2009 | Bade et al. | 713/176 |
| 7,493,656 | B2 * | 2/2009 | Goodwill et al. | 726/9 |
| 7,607,011 | B1 * | 10/2009 | Johnson et al. | 713/166 |
| 7,716,465 | B2 * | 5/2010 | Lewites | 713/2 |
| 8,065,714 | B2 * | 11/2011 | Budko et al. | 726/4 |
| 8,266,448 | B2 * | 9/2012 | Shi et al. | 713/189 |
| 2002/0184345 | A1 * | 12/2002 | Masuyama et al. | 709/220 |
| 2004/0088513 | A1 * | 5/2004 | Biessener et al. | 711/173 |
| 2004/0181657 | A1 * | 9/2004 | Armstrong et al. | 713/1 |
| 2005/0033980 | A1 * | 2/2005 | Willman et al. | 713/200 |
| 2005/0071472 | A1 * | 3/2005 | Arndt et al. | 709/226 |
| 2005/0210467 | A1 * | 9/2005 | Zimmer et al. | 718/1 |
| 2005/0278775 | A1 | 12/2005 | Ross | |
| 2006/0005254 | A1 | 1/2006 | Ross | |
| 2006/0206892 | A1 * | 9/2006 | Vega et al. | 718/1 |
| 2006/0277600 | A1 * | 12/2006 | Goodwill et al. | 726/9 |
| 2007/0261123 | A1 * | 11/2007 | Bade et al. | 726/27 |
| 2007/0266444 | A1 * | 11/2007 | Segal | 726/27 |
| 2007/0283003 | A1 * | 12/2007 | Broyles et al. | 709/224 |

OTHER PUBLICATIONS

Murphy, A., 'Security Implications of the Virtualized Datacenter', 2007, F5 Networks, Inc., entire document, http://www.f5.com/pdf/white-papers/virtual-data-center-security-wp.pdf.*

* cited by examiner

*Primary Examiner* — Edan Orgad
*Assistant Examiner* — Ronald Baum
(74) *Attorney, Agent, or Firm* — Blakely, Sokoloff, Taylor & Zafman LLP (57) ABSTRACT

Methods and apparatuses enable authentication of a hardware platform on a network. The authenticated hardware platform can validate the credentials of virtual machines executing on the hardware platform. The authentication of the hardware platform on the network enables network access to the validated virtual machines. The network access of the virtual machines is managed by the hardware platform, including allowing differentiated access based on, for example, the security posture of each virtual machine.

17 Claims, 5 Drawing Sheets

HARDWARE PLATFORM AUTHENTICATION AND MULTI-PLATFORM VALIDATION

FIELD

Embodiments of the invention relate to authentication of a network device, and more particularly to authenticating a hardware platform of the device.

BACKGROUND

The increase in virtualization technology allows many advantages in having multiple "different devices" executing on a single hardware platform (software virtualization), or the generation of a hardware platform on which to execute from available hardware resources (hardware virtualization). As virtualization increases in use and becomes more common, the scenario can arise within a network (e.g., on an enterprise) where the number of identities that need to be managed in the enterprise grows exponentially. Virtualization allows for the provisioning and dropping of systems dynamically, which increases the complexity of identity management.

One particularly complex problem associated with identity management of multiple identities that can be dynamically provisioned is authentication of a device for purposes of network access and the application of network security policies. If multiple devices (entities) request authentication of a connection using a standard such as 802.1x (e.g., 802.11(a, b, g), 802.12, 802.16, etc.), the task of identity management may prove to be impractical on current systems. Under traditional approaches, an information technology administrator could be faced with needing to balance the security risk of introducing new systems against the productivity benefits accompanying virtualization.

BRIEF DESCRIPTION OF THE DRAWINGS

The following description includes discussion of various figures having illustrations given by way of example of implementations of embodiments of the invention. The drawings should be understood by way of example, and not by way of limitation.

DETAILED DESCRIPTION

As used herein, references to one or more "embodiments" are to be understood as describing a particular feature, structure, or characteristic included in at least one implementation of the invention. Phrases such as "in one embodiment" or "in an alternate embodiment" appearing herein describe various embodiments and implementations of the invention, and do not necessarily all refer to the same embodiment. However, they are also not necessarily mutually exclusive. Descriptions of certain details and implementations follow, with an overview description of embodiments of the invention, followed by a more detailed description with reference to the drawings.

The identity of a platform for purposes of network authentication can be associated with the hardware platform of a device. As used herein, a hardware platform refers to a processing resource having memory and other hardware resources on which a primary operating system partition and other virtual partitions execute. The hardware platform authenticates on the network with an authentication authority. The authentication of the hardware platform can then be used for each virtual device executing on the hardware platform. The network only has to authenticate a single entity associated with a particular hardware device, significantly reducing the task of identity management in the network. The hardware platform itself authenticates the multiple different virtual machines associated with the hardware platform.

In addition to reducing the identity management for the network, the identity of the hardware can be provided in a manner that makes it unlikely to be modified or spoofed, as can happen when operating systems handle the authentication credentials (e.g., if the security of an operating system is breached, the secure information accessible to the operating system is compromised). Thus, having the hardware provide the authentication credentials to the network provides a more robust identity verification. Additionally, the hardware itself can create a virtual environment on the hardware platform (i.e., similar to a mini network) by managing the virtual machines executing on the hardware platform. In one embodiment, the hardware platform enforces a security policy for all virtual machines on the hardware platform using a host-based firewall to manage communication and network access. Communication can be limited, and network access controlled on a precise basis. Similar to having a firewall on a subnet that protects a group of devices on the subnet, the hardware platform can act as the gateway for all virtual entities executing on the hardware platform. In contrast to a network, all the virtual entities execute on the same hardware platform, rather than sharing a network.

To provide security policy enforcement and network access control, the hardware platform controls the network interface. In one embodiment, the hardware platform includes filters on a network interface that allow port- and protocol-based controls. Each partition (e.g., virtual device) on the hardware platform can be controlled according to a specific policy. The partitions may achieve different levels of access, e.g., based on the credentials presented. The identity and security posture of each partition can influence network authorization decisions.

In traditional systems, each operating system must authenticate and provide security compliance information as part of the connection process to gain access to a network from an authentication entity (e.g., a policy decision point (PDP) and/or a policy enforcement point (PEP)). The hardware platform as described herein can act as a PEP, effectively removing the PEP from the network level to the device level. By authenticating the hardware platform and having the hardware platform authenticate the partitions executing on it, a significant authentication burden can be removed from the network level. Additionally, having a hardware based firewall and security protection to manage the connection policies for the virtual machines on the hardware platform provides a robust model for security that requires much less overhead from the enterprise.

In one embodiment, applications could be isolated or enclaved, for purposes of network access/visibility. The hardware platform can give access to a virtual machine to a portion of a network (e.g., specific addresses, ports) while restricting others. The enclaved resources would be protected from compromise from entities outside the enclave network.

Figure 1:
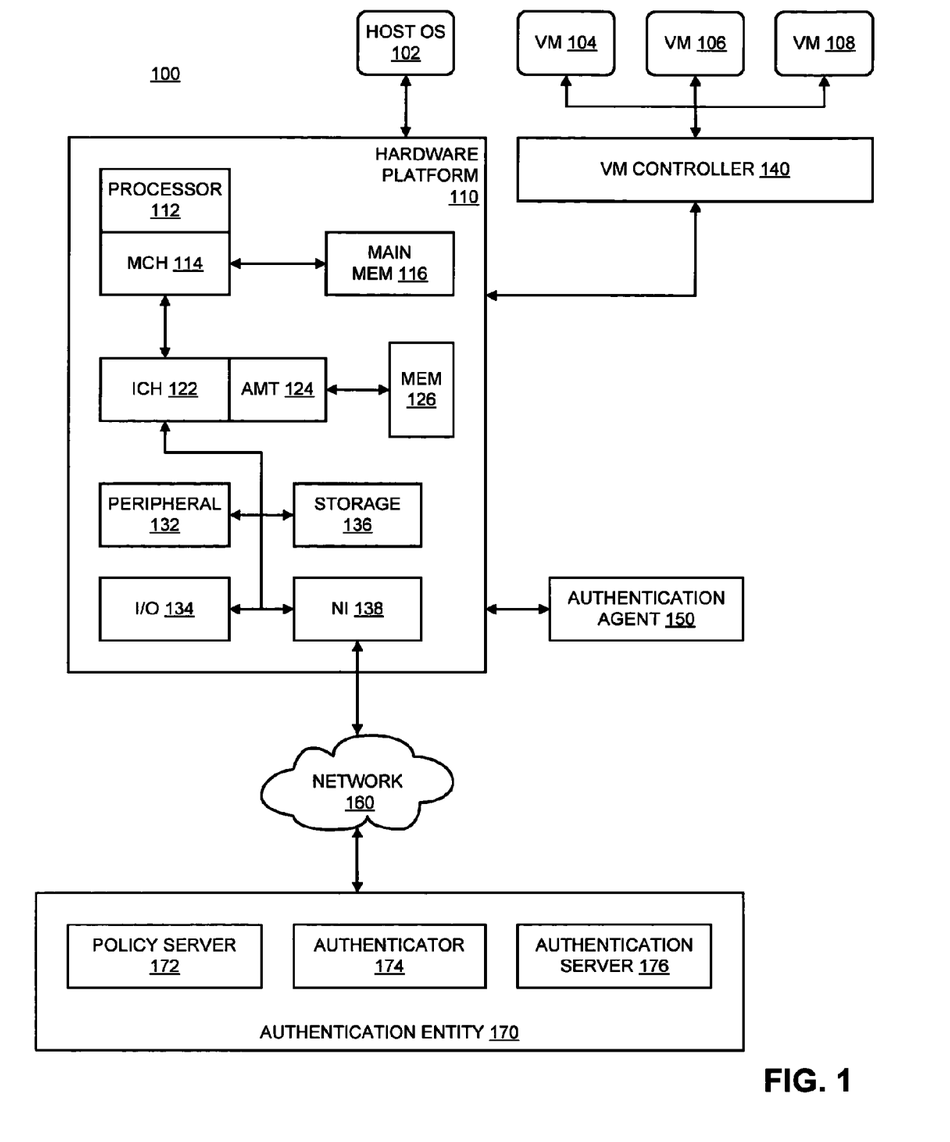
FIG. 1 is a block diagram of an embodiment of a system having an authentication agent that authenticates a hardware platform with a network authentication entity.

FIG. 1 is a block diagram of an embodiment of a system having an authentication agent that authenticates a hardware platform with a network authentication entity. System 100 includes hardware platform 110, which represents a hardware platform as described above. Hardware platform 110 includes multiple elements/components, and allows for multiple partitions to execute on the available hardware. Hardware platform 110 can be, for example, the hardware components of a laptop or desktop computer, workstation, or other computing device capable of generating multiple virtual machines.

Hardware platform 110 includes processor 112, which provides computing capabilities and the ability to execute various operations. Processor 112 may include any type of microprocessor, central processing unit (CPU), processing core including multi-core devices, etc. In one embodiment, processor 112 represents separate physical processor chips that operate in conjunction to provide processing to hardware platform 110. Processor 112 controls the overall operation of hardware platform 110, and may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Hardware platform 110 includes memory controller hub (MCH) 114, which may be integrated onto an integrated circuit of processor 112, or may exist external to processor 112. MCH 114 represents the control logic that controls main memory (mem) 116 of hardware platform 110. As used herein, coupling refers to any type of connectivity, whether electrical, mechanical, and/or communicative. Coupling of one device to another may occur through other hardware. Software components can be coupled to each other or to hardware through function calls, or other invocations of a routine/subroutine. Main memory 116 represents the main memory of hardware platform 110 to provide temporary storage for code or data to be executed by processor 112. Memory 116 may include read-only memory (ROM), flash memory, one or more varieties of random access memory (RAM, e.g., static RAM (SRAM), dynamic RAM (DRAM) synchronous DRAM (SDRAM), etc.), or a combination of memory technologies.

Input/output (I/O) controller hub (ICH) 122 represents control logic that couples I/O devices and/or peripheral devices to processor 112 and/or memory 114. In one embodiment, ICH 122 includes active management technology (AMT—e.g., as available from Intel Corporation of Santa Clara, Calif.). AMT 124 represents hardware and/or software/firmware that provide advanced features to hardware platform 110. In one embodiment, AMT 124 is implemented as a standalone microcontroller on hardware platform 110. In another embodiment, AMT 124 is implemented as firmware on an existing chip of ICH 122. AMT 124 is an out-of-band component with respect to processor 112, or an operating system executing on processor 112. An out-of-band component refers to a component (or in the case of firmware on an existing chip, to processes) that is not visible to an operating system executing on processor 112. An out-of-band component executes in a manner that is not accessible to processor 112 or an operating system executing on processor 112. AMT 124 generally has the ability to influence network connectivity, as discussed in more detail below.

In one embodiment, AMT 124 includes memory 126 to store keys, identity information, credentials, etc. Volatile or non-volatile memory may be used. In one embodiment, memory 126 includes a secure flash device (e.g., a trusted platform module (TPM) in accordance with the Trusted Computing Group suggestions).

ICH 122 is coupled to one or more components, such as peripheral 132, I/O 134, storage 136, and network interface (NI) 138. Peripheral 132 represents any type of peripheral device that could be connected to hardware platform, including external drives, universal serial bus (USB) devices, enhancement and/or utility cards, etc. I/O 134 represents one or more of different types of input and/or output devices, such as monitors, display screens, audio devices, keyboards/keypads, pointer devices (e.g., mouse), etc. Storage 136 represents non-volatile storage or non-volatile memory for hardware platform 110. Non-volatile memory may include any one or more of a conventional magnetic disk (e.g., hard disk), an optical disk (e.g., CD-ROM (compact disk-read only memory), DVD (digital video/versatile disc) based storage), magneto-optical (MO) storage, semiconductor-based storage (e.g., flash), etc. Network interface 138 represents hardware and software that connects to devices external to hardware platform 110. Network interface 138 generally includes a network interface card.

Network 160 represents any type of network with associated hardware and software components. Network 160 can include one or more of a local area network (LAN), wide area network (WAN), metropolitan area network (MAN), global area network (GAN) such as the Internet, or any combination thereof. The connectivity hardware may include Category-5 or other twisted pair cable, coaxial cable, wireless communication transceivers, etc., as well as flow direction hardware (e.g., interface circuits/cards, switches, routers, servers).

Authentication entity 170 is also coupled to network 160. In one embodiment, network 160 includes, or alternatively is included within, an enterprise network. Authentication entity 170 represents one or more devices on a network (e.g., on an enterprise network) that determine what devices can connect to the network and/or determine whether a security policy is being followed by a connecting device. Authentication entity 170 may also be referred to as an "authentication authority" for the network. Authentication entity 170 may include policy server 172, which provides a policy decision point (PDP) for the network. Policy server 172 provides one or more network security policies, including information for determining what devices can connect to a network, and under what circumstances. The policies may allow different levels of access to different users/devices. The policies can also determine what security posture and/or what level of authorization is permissible for given credentials.

Authenticator 174 enables authentication entity 170 to authenticate or verify/validate the identity of a device that requests network access. Authenticator 174 typically receives credentials from the device and checks them against known information. In one embodiment, authenticator 174 provides policy enforcement (as a policy enforcement point (PEP)), assigning and restricting network access based on credentials received. Authenticator 174 can check received credentials against information stored in authentication server 176, which includes information (i.e., credentials) about the devices/users to be connected to the network. The information commonly includes a user name or other user and/or device identifier, and a password. Other information is also possible (e.g., biometric information, secure keys, etc.).

Host operating system (OS) 102 executes on hardware platform 110. Host OS is generally considered a primary partition. In one embodiment, one or more other partitions or virtual machines also execute on hardware platform 110. Virtual machines (VMs) 104-108 represent other entities executing on hardware platform 110. VMs 104-108 can be dynamically provisioned and de-provisioned on hardware platform 110. The virtual machines (which may also be referred to as virtual partitions, or simply partitions) are managed by VM controller 140. VM controller 140 allocates resources for the virtual machines.

System 100 also includes authentication agent 150 coupled to hardware platform 110. Authentication agent 150 is generally part of hardware platform 110. In one embodiment, authentication agent 150 is part of AMT 124. Authentication agent 150 may alternatively be a standalone component or entity on hardware platform 110. Authentication agent 150 allows for authentication of hardware platform 110 with authentication entity on behalf of one or more (e.g., all) partitions executing on the hardware platform. In one embodiment, selected VMs are designated by a flag or other indicator to authenticate themselves on the network. Other VMs obtain network access through the authentication of the hardware platform. In another embodiment, authentication of hardware platform 110 on the network is performed on behalf of all VMs executing on the hardware platform, including any VMs that may be provisioned after the authentication of the hardware platform. Authentication agent 150 authenticates or validates one or more VMs executing on the hardware platform, instead of providing credentials for those entities to the network for authentication.

Figure 2:
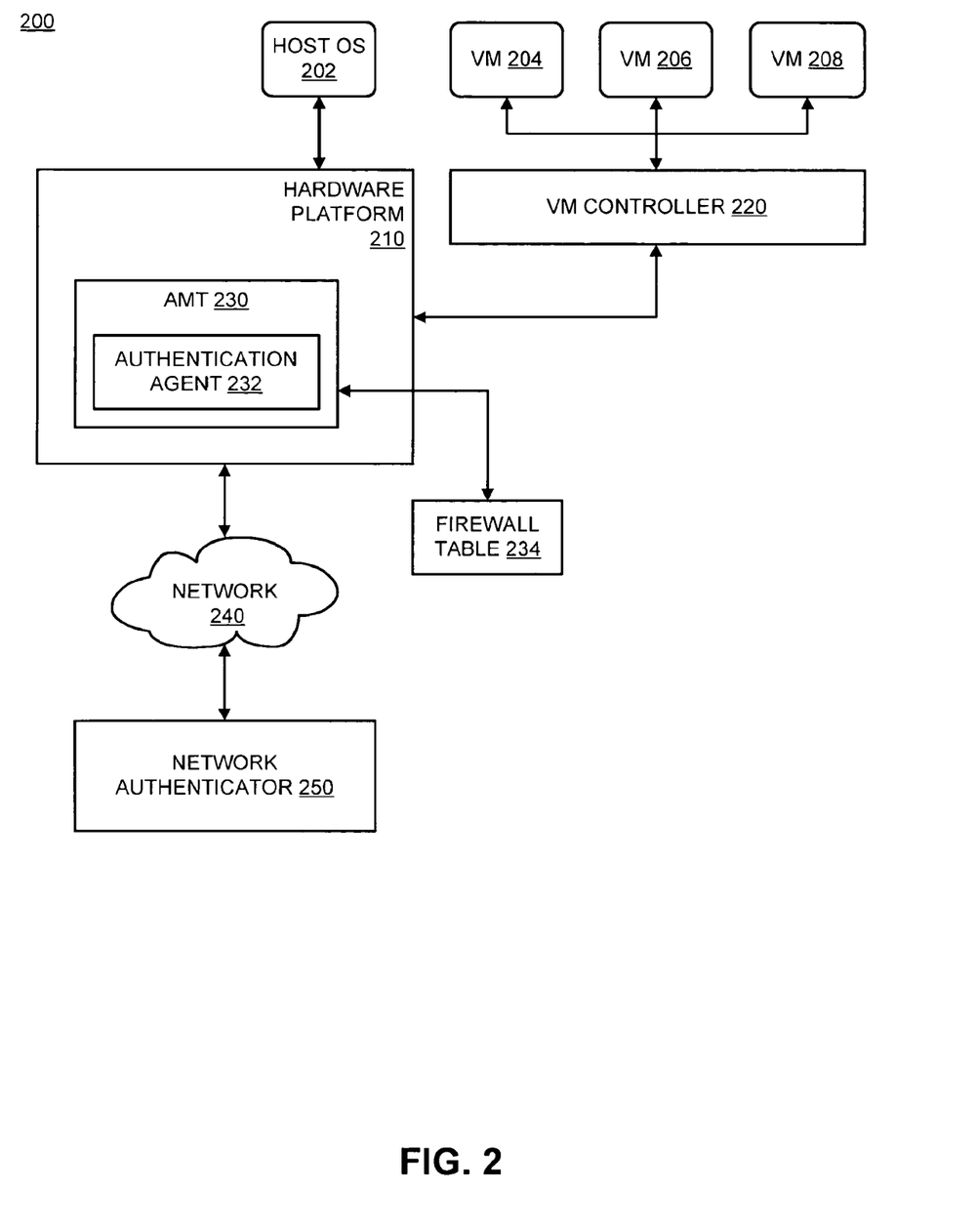
FIG. 2 is a block diagram of an embodiment of a system having a hardware platform that is authenticated with an authentication agent that provides firewall service.

FIG. 2 is a block diagram of an embodiment of a system having a hardware platform that is authenticated with an authentication agent that provides firewall service. System 200 includes hardware platform 210, which provides hardware on which host operating system (OS) 202 and one or more virtual machines (VMs) 204-208 execute. VMs 204-208 can be separate OS partitions. VMs 204-208 are managed by VM controller 220, and can be dynamically provisioned and de-provisioned. Each VM will include an identity that can be represented as credentials to present for purposes of authentication for network connectivity.

Traditional systems required each VM to provide credentials over network 240 to network authenticator 250 for network access. However, because the VMs can be dynamically provisioned, the traditional requirement for individual VM identity management by network authenticator 250 could result in hundreds or thousands of network identities that network authenticator 250 would need to manage. Management of so many entities could result in an identity crisis for network authenticator 250 in traditional system. In one embodiment, hardware platform 210 includes AMT 230, which includes authentication agent 232. Authentication agent 232 provides for authentication of the hardware platform according to any embodiment described herein.

In one embodiment, authentication agent 232 provides firewall services to hardware platform 210. The firewall services provided by authentication agent 232 cannot be attacked or disabled by an attacker that compromises host OS 202. Thus, firewall services provided by authentication agent 232 are more secure from attack than traditional software firewalls that interact with the host operating system. Authentication agent 232 stores in memory, or has access to memory that stores, firewall table 234. Firewall table 234 provides policy enforcement rules to authentication agent 232 to enable authentication agent 232 to enforce network security policy locally on hardware platform 210. In one embodiment, firewall table 234 is received from network authenticator 250, or is based on information received from network authenticator 250. Thus, policy enforcement can be provided by the hardware platform itself to secure host OS 202 and one or more of VMs 204-208.

Figure 3:
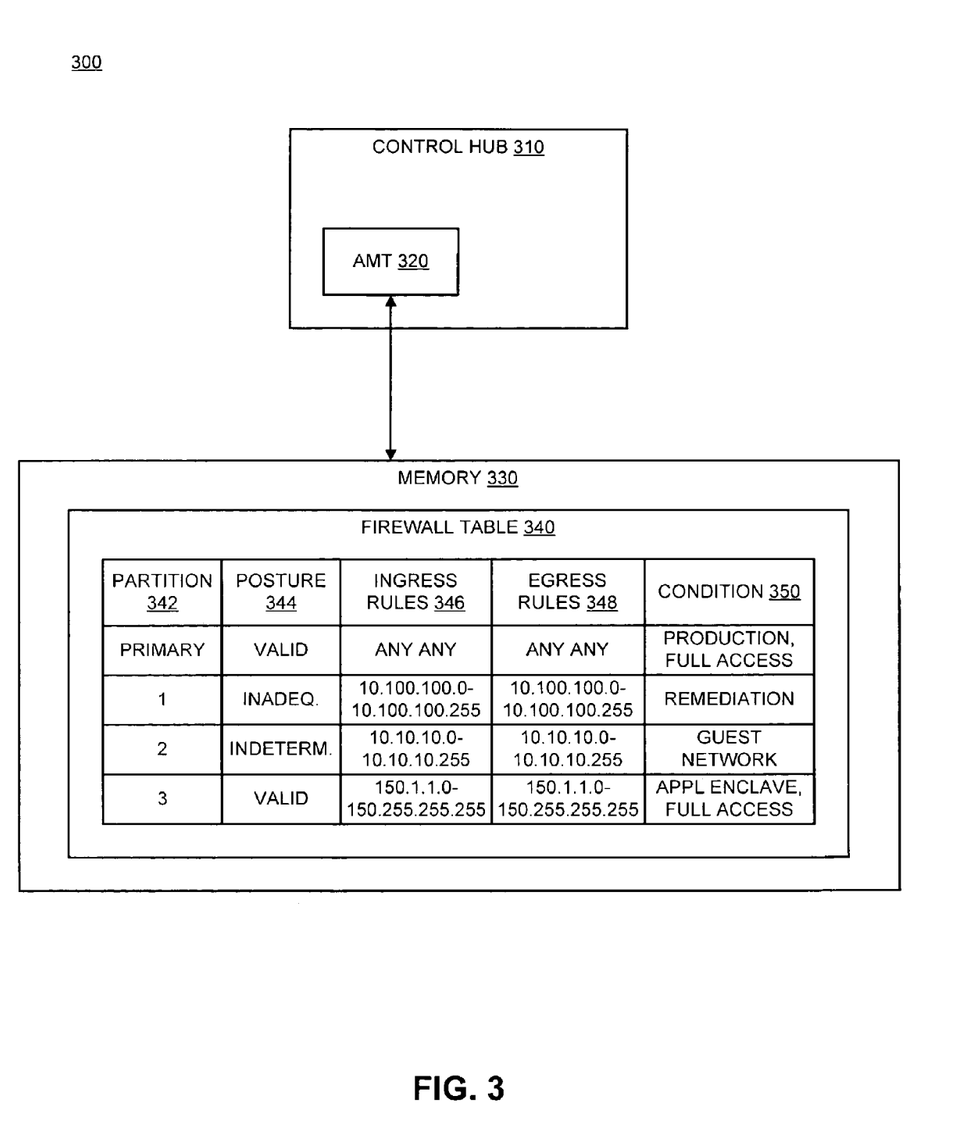
FIG. 3 is a block diagram of an embodiment of a control hub having an active management entity that enforces rules of a firewall table.

FIG. 3 is a block diagram of an embodiment of a control hub having an active management entity that enforces rules of a firewall table. System 300 represents a hardware platform on which multiple partitions execute. System 300 includes control hub 310, which may represent an ICH or MCH, or other hub or control circuit that includes AMT 320. In one embodiment, AMT 320 performs operations that authenticate the hardware platform of system 300, and leverages that authentication to provide network access to the partitions executing on system 300. AMT 320 validates the individual partitions and manages the network connections established by the partitions. As part of the management of the network access by the partitions, AMT 320 may access memory 330 that includes firewall table 340. Memory 330 can be any type of memory, whether volatile or non-volatile, accessible to AMT 320. Memory 330 can be private to AMT 320, or may be a secure portion or partition of a memory available on the hardware platform.

Firewall table 340 may simply represent a table of rules that AMT 320 applies. Thus, AMT 320 could be referred to as a firewall because it performs network access restriction functions based on the information in firewall table 340. Examples of information that firewall table 340 may contain are partition identifier 342, partition posture 344, ingress rules 346, egress rules 348, and other conditions 350. Other types of information may be stored in firewall table 340.

Partition identifier 342 indicates the partition number to which the rules specified in the other columns applies. Although a primary partition and 3 additional partitions are indicated in partition identifier 342, more or fewer partitions can be provided in a system. Posture 344 indicates an authentication posture of the partition. Additional rules may be included regarding authorization or other security postures. As shown, examples of authorization posture values could include "valid," "inadequate," or "indeterminable" (e.g., not able to be discerned due to a configuration of the partition). Other postures could be provided, depending on the implementation.

Ingress rules 346 can specify address accessibility for the given partitions for inbound traffic. The specification may be "ANY ANY," which permits all traffic on all ports, or specific traffic accessibility can be provided. Similar restrictions can be provided in egress rules 348. Note that although the allowable traffic assignments are the same for ingress and egress traffic in firewall table 340 for a given partition, there is not a requirement to permit the same traffic channels for inbound and outbound traffic.

Condition 350 can provide conditions that apply to a particular partition. The information can be merely descriptive, rather than providing substantive restrictions. Examples of the conditions may be that a partition has full production access, that a partition is placed on a remediation network (e.g., until a defective security posture is corrected), that the partition has guest network access, or that the partition is assigned to an enclave network associated with a particular application (e.g., a network dedicated to enterprise software traffic). The different network assignments can be protected by different filtering and firewalling on the network. Thus, the rule assignments in ingress rules 346 and egress rules 348 will typically correspond to network separations provided on the network.

Figure 4:
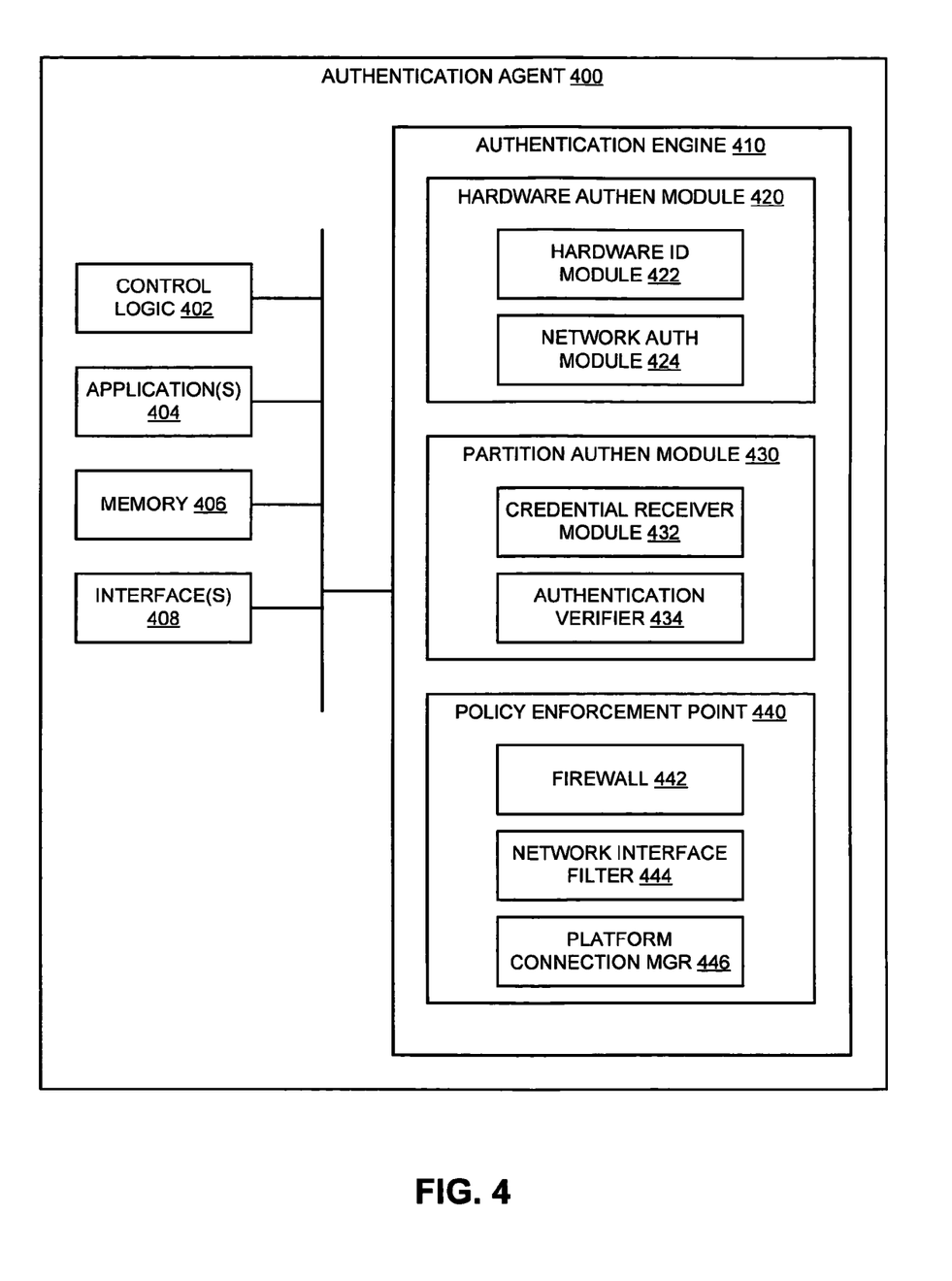
FIG. 4 is a block diagram of an embodiment of an authentication agent.

FIG. 4 is a block diagram of an embodiment of an authentication agent. Authentication agent 400 includes control logic 402, which implements logical functional control to direct operation of authentication agent 400, and/or hardware associated with directing operation of authentication agent 400. Logic may be hardware logic circuits and/or software routines. The logic may be instructions executing on a processor of a computing device. In one embodiment, authentication agent 400 includes one or more applications 404, which represent code sequences and/or programs that provide instructions to control logic 402. Authentication agent 400 includes memory 406 and/or access to memory resource 406 for storing data and/or instructions. Memory 406 may include memory local to authentication agent 400, as well as, or alternatively, including memory of a system on which authentication agent 400 resides. Authentication agent 400 also includes one or more interfaces 408, which represent access interfaces to/from (an input/output interface) authentication agent 400 with regard to entities (electronic or human) external to authentication agent 400. Interfaces 408 include mechanisms through which authentication agent 400 can be incorporated into a host system.

Authentication agent 400 also includes authentication engine 410, which represents one or more functional components that enable authentication agent 400 to provide authentication operations. The authentication operations include authenticating a hardware platform on the network, and authenticating partitions to the hardware platform. The functions or features of the components include, or are provided by, one or more of hardware authentication (authen) module 420, partition authentication module 430, and policy enforcement point 440. Each module may further include other modules to provide specific functionality. As used herein, a module refers to routine, a subsystem, etc., whether implemented in hardware, software, or some combination. One or more modules can be implemented as hardware while other(s) are implemented in software.

Hardware authentication module 420 enables authentication engine 410 to authenticate a hardware platform with a network. Hardware authentication module 420 includes hardware identifier module 422, which determines/identifies an identity associated with a hardware platform. For example, current network authentication typically involves the storing of a user name and password at a network authentication authority. The user name and password are presented to the authentication authority, which can then provide access. Instead, or in addition to what is traditionally done, the authentication authority may store an identity assigned to a hardware component of the hardware platform. For example, a unique identifier can be assigned and stored by an authentication agent for each hardware device in the system. Thus, hardware identifier module 422 may store and manage the hardware identity.

Network authentication module 424 of hardware authentication module 420 retrieves the identity and presents it as part of a presentation of credentials to the authentication authority in conjunction with a request to access the network. In one embodiment, network authentication module 424 authenticates the hardware platform on the network at initialization or in conjunction with initialization of the hardware platform (either from startup or reset). Network authentication module 424 could authenticate the hardware platform after initialization. The authentication of the hardware platform can be performed prior to or after provisioning of a partition, which could include the host OS or primary partition.

Partition authentication module 430 enables authentication engine 410 to validate the credentials of partitions executing on a hardware platform with which authentication agent 400 is associated. Partition authentication module 430 includes credential receiver module 432 to receive the credentials of the various partitions. Credential receiver module 432 may include a redirection from a network interface. For example, credential receiver module 432 could direct a network interface controller to forward credentials received from the various partitions to authentication agent 400. Instead of forwarding the credentials to the network authentication authority for validation, the credentials are validated by partition authentication module 430. Partition authentication module 430 includes authentication verifier 434, which checks the credentials against known information for a requesting partition. The number of identities to manage at the authentication agent is much smaller and more manageable than the number of entities that would need to be managed by a server for the entire network.

When validated with partition authentication module 430, validated partitions can access the network based on the connections available to the hardware platform. In one embodiment, the hardware platform has restricted access based on its credentials. Thus, the partitions on the hardware platform cannot have access greater than what is available to the hardware platform. In one embodiment, unlimited access is granted from the network to the hardware platform, and the hardware platform via authentication agent 400 provides restrictions on the partitions.

Policy enforcement point (PEP) 440 enables authentication engine 410 to manage network connections open by one or more partitions on the hardware platform. Through PEP 440, authentication engine 410 controls network access of partitions executing on the hardware platform, allowing differentiated network access. The differentiated network access can be provided based on security posture of the partitions, authorizations associated with the credentials, etc. PEP 440 includes firewall 442, which provides security enforcement to network connections of partitions validated by authentication agent 400. Firewall 442 applies rules, for example, from a rule table that stores the permissions established for each partition.

In one embodiment, PEP 440 includes one or more network interface filters 444. Network interface filter 444 enables PEP 440 to control network access with fine granularity. Network interface filter 444 can restrict or allow traffic of particular protocols, from particular device, on particular ports, over particular channels, etc., or any combination. Network interface filters 444 can enable PEP 440 to manage all connections on the hardware platform.

PEP 440 includes platform connection manager 446 to track and manage connections for all validated partitions. Platform connection manager 446 operates in conjunction with network interface filters 444 to determine an appropriate network, an appropriate level of access, etc., for a given partition, and enforce the determination.

The descriptions herein of managers or modules, describe components that may include hardware, software, and/or a combination of these. In a case where a component to perform operations described herein includes software, the software data, instructions, and/or configuration may be provided via an article of manufacture by a machine/electronic device/hardware. An article of manufacture may include a machine readable medium having content to provide instructions, data, etc. The content may result in an electronic device as described herein, performing various operations or executions described. A machine readable medium includes any mechanism that provides (i.e., stores and/or transmits) information/content in a form accessible by a machine (e.g., computing device, electronic device, electronic system/subsystem, etc.). For example, a machine readable medium includes recordable/non-recordable media (e.g., read only memory (ROM), random access memory (RAM), magnetic disk storage media, optical storage media, flash memory devices, etc.). The machine readable medium may further include an electronic device having code loaded on a storage that may be executed when the electronic device is in operation. Thus, delivering an electronic device with such code may be understood as providing the article of manufacture with such content described herein. Furthermore, storing code on a database or other memory location and offering the code for download over a communication medium may be understood as providing the article of manufacture with such content described herein.

Figure 5:
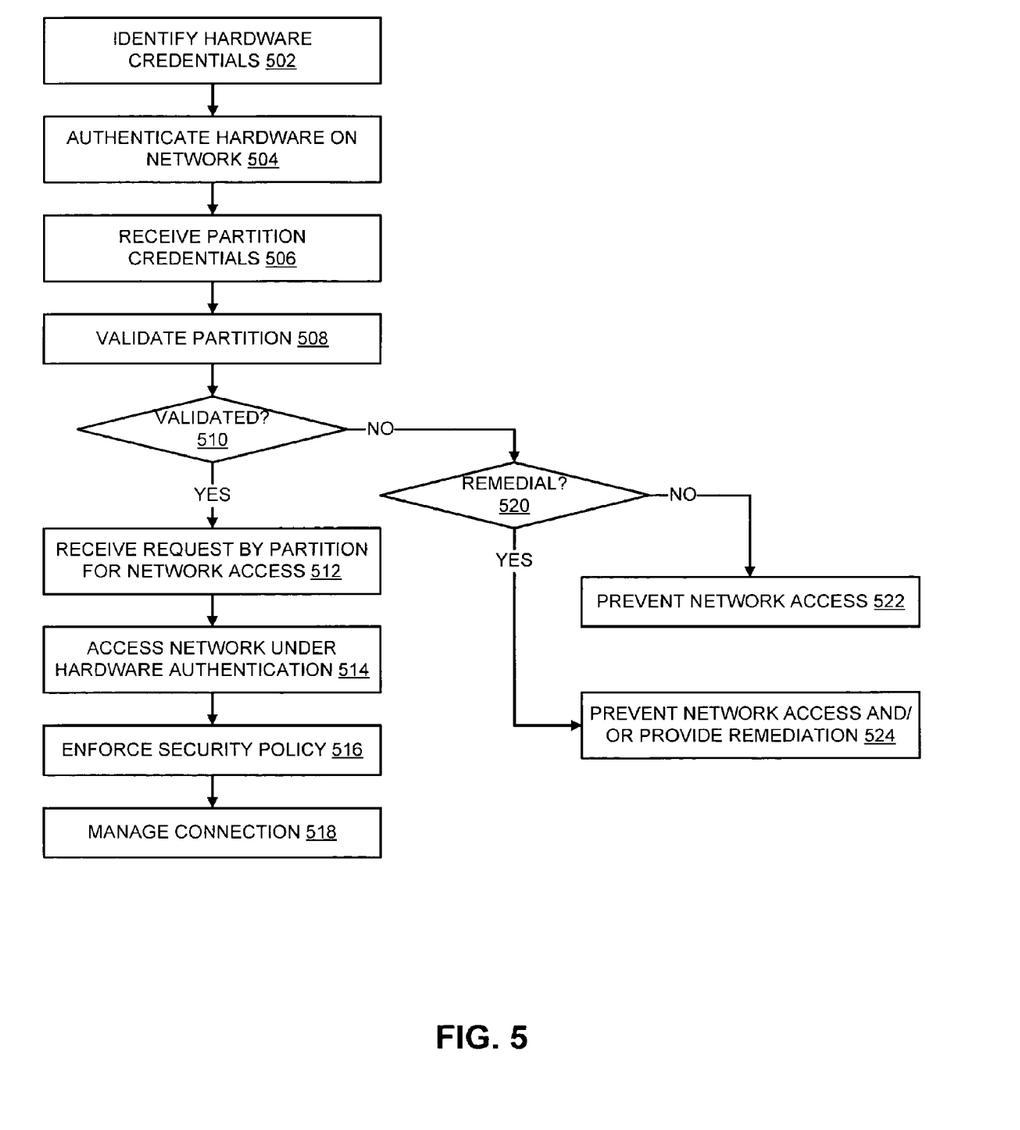
FIG. 5 is a flow diagram of an embodiment of a process for authenticating a hardware platform with a network, and authenticating with the hardware platform partitions executing on the hardware platform.

FIG. 5 is a flow diagram of an embodiment of a process for authenticating a hardware platform with a network, and authenticating with the hardware platform partitions executing on the hardware platform. An authentication agent identifies hardware credentials associated with a hardware platform to be authenticated on the network, 502. The authentication agent presents the credentials and negotiates the network authentication. Thus, the authentication agent authenticates the hardware on the network, 504. The hardware platform is authenticated on behalf of partitions executing on the hardware platform.

The authentication agent receives credentials from a partition that requests network access, 506. The authentication agent enters an authentication procedure with the partition and attempts to validate the partition's identity, 508. If the partition is validated, 510, the authentication agent receives the request by the validated partition for network access, 512. The validated partition is allowed access to the network under the authentication of the hardware platform, 514, as appropriate for the credentials provided (e.g., certain partitions may be restricted in access). The authentication agent can continue to monitor traffic from the authenticated partition and enforce a network security policy to the network access of the partition, 516. The enforcing of the policy generally includes assigning a network and restriction control. For example, a partition may be given access only to a particular network (e.g., a virtual enclave network designated for particular applications). The authentication agent can continue to manage the connection, 518.

The partition may not validate. A partition that does not validate, or a partition for which a security posture cannot be determined may fail validation, 510. The authentication agent can determine if the failed validation is remedial, 520. The failed validation may be remedial, for example, if a remediation network is set up. The authentication agent can then assign the partition to the remediation network. Similarly, the validation may fail to gain access to the network because the partition has "guest" credentials, and so is assigned to a guest network. In one embodiment, the partition fails to validate, and network access may be prevented, 522. If remediation is possible, 520, the authentication agent prevents access to restricted networks or portions of the network/protocols, ports, etc., and/or provides remediation, 524. Remediation may include updating a security posture of the partition to enable it to be compliant with a security policy and gain more expanded network access.

A flow diagram as illustrated herein provides an example of a sequence of various operations. Although shown in a particular sequence or order, unless otherwise specified, the order of the operations can be modified. Thus, the illustrated implementations should be understood only as examples, and operations can be performed in a different order, and some operations may be performed in parallel.

Besides what is described herein, various modifications may be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A method for network authentication, comprising:
authenticating a hardware platform of a device to permit access to a network by the device,
the authenticating including obtaining from a network authentication authority a hardware platform network authentication to authorize network access by the hardware platform based on authentication credentials of the hardware platform,
the network authentication authority separate from the device,
the network authentication produced independently of an operating system of the device,
wherein the hardware platform having multiple virtual machines (VMs) that execute on the hardware platform, sharing hardware resources of the hardware platform;
validating one or more VMs of the authenticated hardware platform; and
controlling network access of the one or more virtual VMs with the authenticated hardware platform based at least in part on a result of the validated of the VMs.

2. The method of claim 1, wherein authenticating the hardware platform comprises:
accessing identity credentials associated with the hardware platform;
presenting the identity credentials from the hardware platform to a network authentication entity; and
receiving a network access assignment for the hardware platform in response to presenting the identity credentials.

3. The method of claim 1, wherein validating the VMs comprises:
validating at the authenticated hardware platform a non-primary VM that executes on the hardware platform.

4. The method of claim 1, wherein validating the VM comprises:
presenting credentials of the VM from the VM to the authenticated hardware platform;
receiving confirmation of the credentials at the VM from the hardware platform; and
enabling the VM to access the network via the authentication of the hardware platform.

5. The method of claim 1, wherein controlling network access of the VM with the authenticated hardware platform comprises:
preventing network access to the VM.

6. The method of claim 1, wherein controlling network access of the VM with the authenticated hardware platform further comprises:
enforcing a network security policy to network access of the VM with the authenticated hardware platform.

7. The method of claim 6, wherein enforcing the network security policy comprises:
applying access filters to a network access interface to restrict the network access of the VM.

8. The method of claim 7, wherein applying the access filters to restrict the network access of the VM comprises:
restricting the network access of the VM based on a defect in a security posture of the VM.

9. The method of claim 6, wherein enforcing the network security policy comprises:

determining that the VM includes an application subject to an enclave use restriction; and limiting the network access of the VM in accordance with the enclave use restriction.

10. An article of manufacture comprising a machine readable non-transitory storage medium having content stored thereon to provide instructions to cause a device to perform operations, including:

transmitting to a network authentication authority for authentication credentials associated with a hardware component of the device, the hardware component being a component of a hardware platform on which multiple virtual devices execute, the hardware component being inaccessible by a host operating system of the device, the credentials provided for authentication on behalf of multiple virtual devices executing on the hardware platform and sharing hardware resources of the hardware platform;

receiving an authentication message and a network access assignment in response to providing the authentication credentials, the credentials to authorize network access by the hardware component;

validating a virtual device of the hardware platform with the hardware component, the validated virtual device to access the network with the network access assignment of the hardware component; and managing the network access of the virtual device with the hardware component based at least in part on a network security policy.

11. The article of manufacture of claim 10, wherein the content to provide instructions for transmitting the credentials associated with the hardware component comprises content to provide instructions for:

transmitting credentials associated with an active management technology microprocessor of the hardware platform.

12. The article of manufacture of claim 10, wherein the content to provide instructions for transmitting the credentials for authentication on behalf of multiple VMs executing on the hardware platform comprises content to provide instructions for:

transmitting the credentials for authentication prior to provisioning the VM.

13. The article of manufacture of claim 10, wherein the content to provide instructions for validating the VM of the hardware platform comprises content to provide instructions for:

identifying an authorization of the VM; and wherein the content to provide instructions for managing the network access of the VM with the hardware component comprises content to provide instructions for:

managing the access based at least in part on the identified authorization of the VM.

14. A system comprising:

a hardware platform of a device including memory resources and processing resources, on which multiple virtual machines (VMs) are to execute;

a hardware authentication module to identify authentication credentials associated with the hardware platform and present the credentials to a network authentication entity to authenticate the hardware platform on behalf of multiple VMs executing on the hardware platform; and VM authentication module coupled to the hardware authentication module, the VM authentication module to receive credentials from the multiple VMs executing on the hardware platform and validate the VMs without presenting VM credentials to the network authentication entity, to enable the VMs to obtain network access via an authentication of the hardware platform.

15. The authentication agent of claim 14, further comprising:

a policy enforcement point coupled to the partition authentication module, to apply a network security policy to the network access of the VMs.

16. The authentication agent of claim 15, the policy enforcement point further comprising:

a firewall that executes out-of-band to a host operating system of the device.

17. The authentication agent of claim 15, the policy enforcement point further comprising:

a platform connection manager to manage all network connections originating from VMs on the hardware platform.

* * * * *

UNITED STATES PATENT AND TRADEMARK OFFICE
CERTIFICATE OF CORRECTION

PATENT NO.         : 8,365,294 B2                                    Page 1 of 1
APPLICATION NO.    : 11/479180
DATED              : January 29, 2013
INVENTOR(S)        : Ross It is certified that error appears in the above-identified patent and that said Letters Patent is hereby corrected as shown below:

In the Claims

In column 10, at line 25 delete, "more virtual VMs" and insert -- more validated VMs --.

In column 10, at line 27 delete, "the validated" and insert -- the validating --.

In column 11, at line 13 delete, "virtual devices" and insert -- virtual machines (VMs) --.

In column 11, at line 16 delete, "virtual devices" and insert -- VMs --.

In column 11, at line 23 delete, "virtual device" and insert -- VM --.

In column 11, at line 24 delete, "virtual device" and insert -- VM --.

In column 11, at line 27 delete, "virtual device" and insert -- VM --.

Signed and Sealed this
Fourth Day of March, 2014

Michelle K. Lee
*Deputy Director of the United States Patent and Trademark Office*